(12) United States Patent
Feinberg et al.

(10) Patent No.: US 7,506,255 B1
(45) Date of Patent: Mar. 17, 2009

(54) DISPLAY OF TEXT IN A MULTI-LINGUAL ENVIRONMENT

(75) Inventors: Yaniv Feinberg, Redmond, WA (US); Soohad Khoury, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/780,055

(22) Filed: Feb. 17, 2004

(51) Int. Cl.
*G06F 17/00* (2006.01)

(52) U.S. Cl. .................. 715/264; 715/246; 715/256

(58) Field of Classification Search ............... 715/520, 715/531, 536, 246, 256, 264
See application file for complete search history.

(56) References Cited

U.S. PATENT DOCUMENTS

| | | | |
|---|---|---|---|
| 6,216,102 B1 * | 4/2001 | Martino et al. ............. | 704/9 |
| 2002/0143825 A1 * | 10/2002 | Feinberg ................... | 707/526 |
| 2004/0249627 A1 * | 12/2004 | Mirkin ..................... | 704/3 |

OTHER PUBLICATIONS

"Claris Works—Word Processing" Jan. 19, 2001 http://pt3.ed.asu.edu/Fall2002StudentBlock/SoftwareTutorials/ClarisWorks_WP.pdf.*
Suignard, Michel, CSS3 Text Module W3C Candidate Recommendation May 14, 2003 http://www.w3.org/TR/2003/CR-css3-text-20030514.*
Davis, M., "The Birdirectional Algorithm," UAX #9: The Birectional Algorithm, http://www.unicode.org/reports/tr9/tr9-11-html, Apr. 17, 2003.

* cited by examiner

*Primary Examiner*—Stephen S Hong
*Assistant Examiner*—Adam M Queler
(74) *Attorney, Agent, or Firm*—Merchant & Gould (57) ABSTRACT

Methods and systems for rendering text in a multi-lingual environment are provided. Language context of entered text and user interface settings are used to determine a most appropriate rendering order and alignment for displayed text. If no reading order is specified for a given text selection, the text selection is scanned to determine whether properties of the text identify portions of the text as requiring one of two reading orders (left-to-right or right-to-left). If a reading order can be determined for a given portion of the text selection, that portion will be rendered according to the determined reading order, such that the rendered text selection may have portions rendered according to a first reading order and portions rendered according to a second reading order. If no determination can be made by analysis of the text selection, a reading order is returned for the text selection that is associated with the spoken language utilized by the user interface with which the text selection is rendered. The text selection is aligned to the right or to the left based on user selection if available. In the absence of user alignment selection, the text selection is aligned according to an alignment associated with the spoken language utilized by the user interface with which the text selection is rendered.

19 Claims, 5 Drawing Sheets

DISPLAY OF TEXT IN A MULTI-LINGUAL ENVIRONMENT

FIELD OF THE INVENTION

The present invention generally relates to text and data rendering by computer software applications. More particularly, embodiments of the present invention relate to methods and systems for displaying text in a multi-lingual environment.

BACKGROUND OF THE INVENTION

With the rapid growth in the use of computers and computer software in recent years, software developers have developed applications that are used by a wide variety of users in business, education and leisure. Software applications are used for creating, displaying and utilizing text and data according to a great number of spoken languages. Some spoken languages such as English are read from left-to-right and are typically displayed or printed in a left alignment. Other languages such as Arabic and Hebrew and a number of Asian languages are read from right-to-left and are typically displayed or printed in a right alignment. Prior software applications may be caused to render text according to a reading order and alignment associated with a given language.

A problem exists, however, when text is rendered in a multi-lingual environment. For example, if a memorandum is prepared using a word processing application containing some sentences or paragraphs in English and some sentences or paragraphs in Arabic, a word processing application likely will align the English language text to the left and the Arabic language text to the right. When the rendered text is displayed or printed, an unsatisfactory user experience results. Likewise, if the word processing application, for example, does not recognize that the text is to be displayed according to two different spoken languages having two different text reading orders, the text reading order for one of the two displayed texts may be displayed incorrectly. For another example, if an electronic mail is sent to a recipient containing text entered by the sender according to multiple languages, for example English and Hebrew, the recipient electronic mail application likely will display the English language portion of the mail according to a left-to-right reading order and left alignment and the Hebrew language portion of the mail according to a right-to-left reading order and right alignment.

It is with respect to these and other considerations that the present invention has been made.

SUMMARY OF THE INVENTION

Embodiments of the present invention solve the above and other problems by providing improved methods and systems for rendering text in a multi-lingual environment. Generally, language context of entered text and user interface settings are used to determine a most appropriate rendering order and alignment for displayed text. If no reading order is specified for a given text selection, the text selection is scanned to determine whether properties of the text identify portions of the text as requiring one of two reading orders (left-to-right or right-to-left). If a reading order can be determined for a given portion of the text selection, that portion will be rendered according to the determined reading order, such that the rendered text selection may have portions rendered according to a first reading order and portions rendered according to a second reading order. If no determination can be made by analysis of the text selection, a reading order is returned for the text selection that is associated with the spoken language utilized by the user interface with which the text selection is rendered. The text selection is aligned to the right or to the left based on user selection if available. In the absence of user alignment selection, the text selection is aligned according to an alignment associated with the spoken language utilized by the user interface with which the text selection is rendered.

According to aspects of the invention, as text is entered by a user, each character of the text is stored in a memory location in the order in which it was entered. To determine a reading order or direction of the text, a determination is first made as to whether the user has specified a particular direction, for example, right-to-left. If the user has specified a particular text reading order direction, the specified text reading order is returned regardless of the language context of the text. If no text reading order has been specified by the user, the text entered by the user is scanned on a character-by-character basis to determine whether one or more characters is present that identifies the text as belonging to a particular language and having a traditional text reading order or reading order, for example, right-to-left. If one or more characters is found that identify a particular text reading order, a determination is made that the one or more characters is to be rendered in a text reading order particular to the language to which the one or more characters belong. If no characters are found that identify a particular language context, a determination is then made as to whether a particular language context is associated with a full line of entered text. If a particular language context having a traditional text reading order is determined for a full line of entered text, that text reading order is returned for rendering the line of text. If no text reading order can be determined for a full line of entered text, a determination is made as to whether a full paragraph of text is associated with a particular language context and text reading order. If a particular text reading order can be determined from a review of the full paragraph of text, that text reading order is returned for rendering the full paragraph of text. If a text reading order cannot be determined from a language context of the entered text, then a text reading order is returned for the language context of the user interface utilized by the software application with which the text is being entered and/or displayed.

After a text reading order is determined for portions of the text entered by the user, a text alignment (i.e., left alignment or right alignment) is determined. First, a determination is made as to whether the user has specified a particular text alignment. If a particular text alignment has been specified by the user, that text alignment is returned for displaying the text. If no particular text alignment has been specified for aligning the text, a determination is made as to what traditional text alignment is associated with the language context of the user interface utilized by the software application used for displaying the text. For example, if a user interface is displayed according to a traditionally left aligned language (e.g., English) then a left alignment is returned for displaying the text.

After text reading order is determined for various portions of the text and after a display alignment is determined, the text is displayed. Portions of the text that are determined to have a left-to-right text reading order are displayed in a left-to-right text reading order. Texts that are determined to have a right-to-left text reading order are displayed in a right-to-left text reading order. All of the displayed texts, regardless of determined text reading order, are then aligned either to the left or to the right according to the text alignment.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As described briefly above, embodiments of the present invention are directed to improved methods and systems for rendering and displaying text in a multi-lingual environment In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
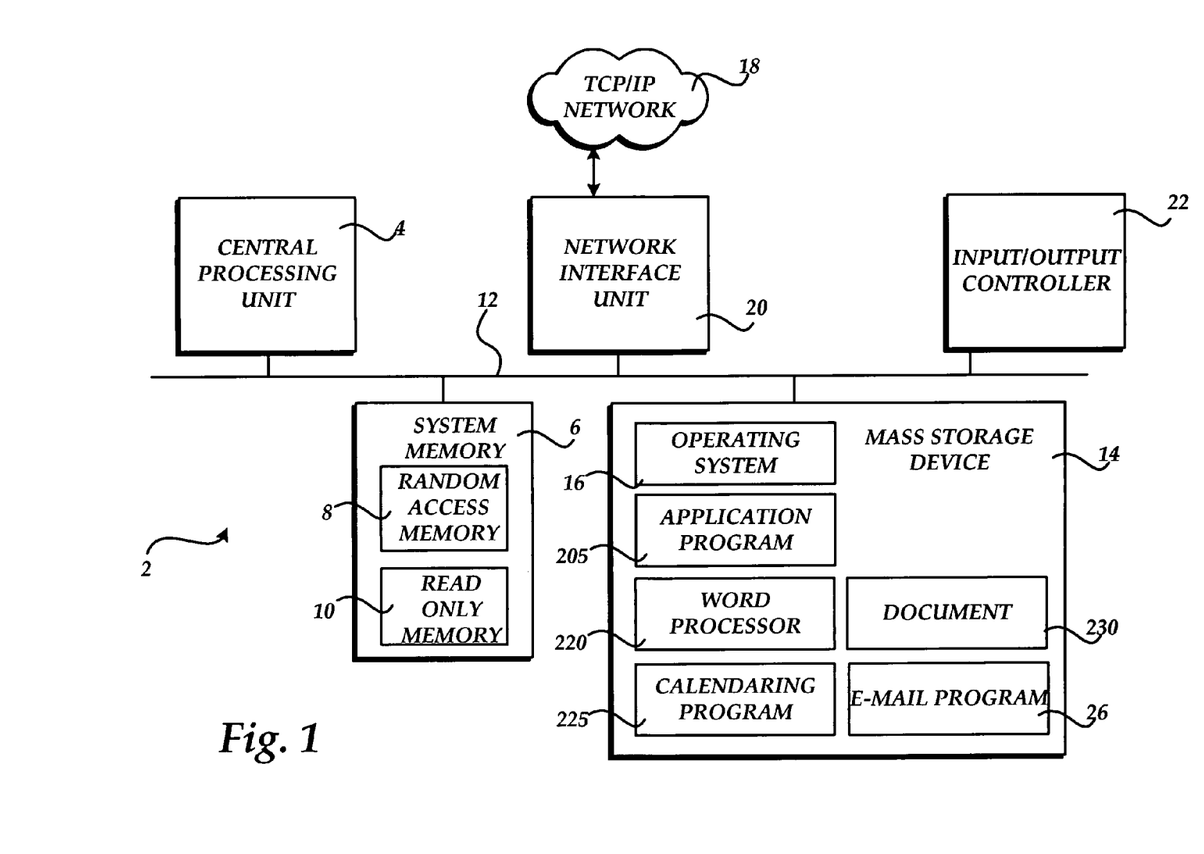
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program, a spreadsheet application, a contact application, and the like. Other application programs illustrated in FIG. 1 include a word processing application 220, a calendaring program 225 and an email program 26. Application programs for creating and editing other types of electronic documents may also be used with the various embodiments of the present invention.

Figure 2:
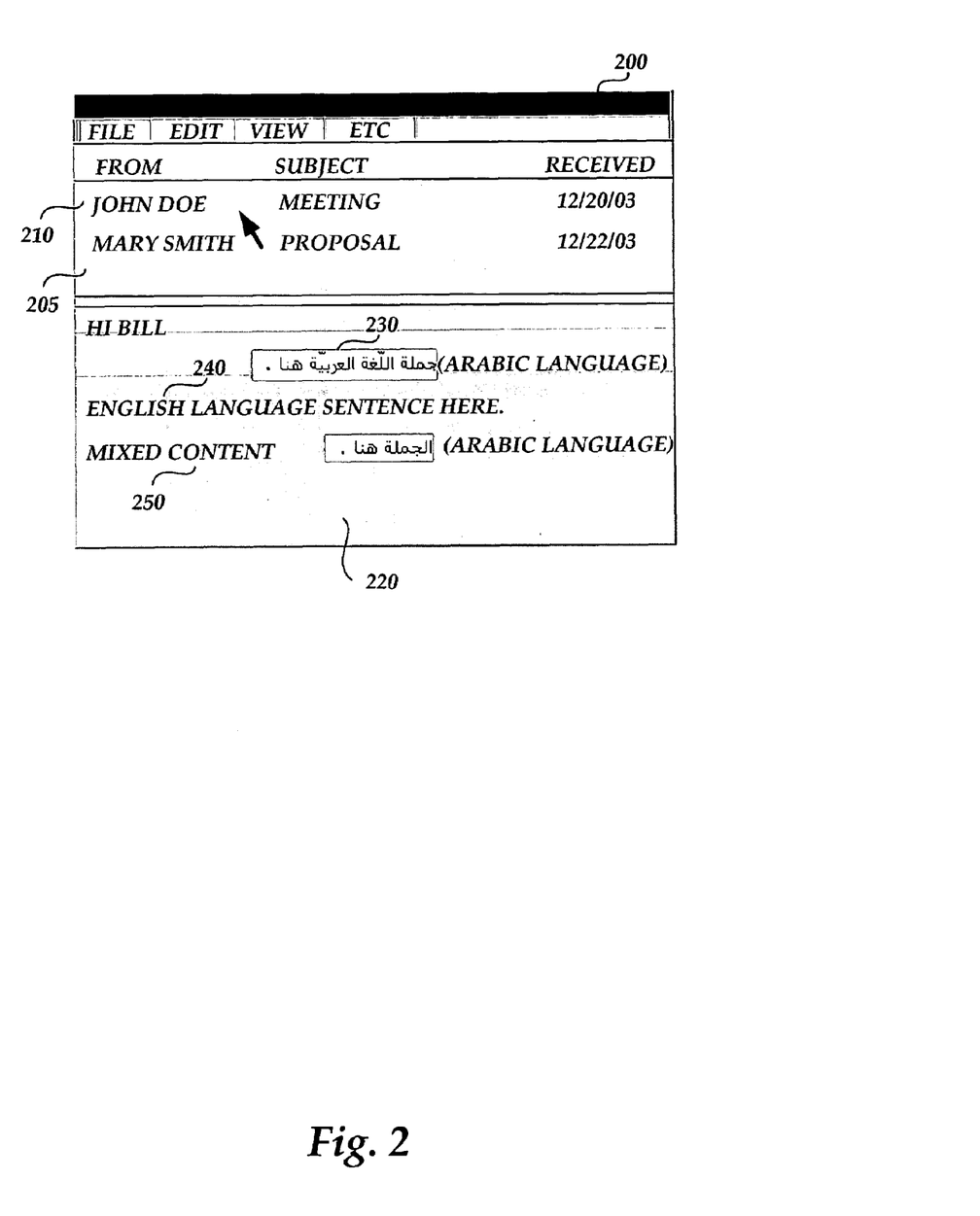
FIGS. 2 and 3 illustrate screen displays of an exemplary electronic mail application user interface showing rendered text according to embodiments of the present invention.
Figure 3:
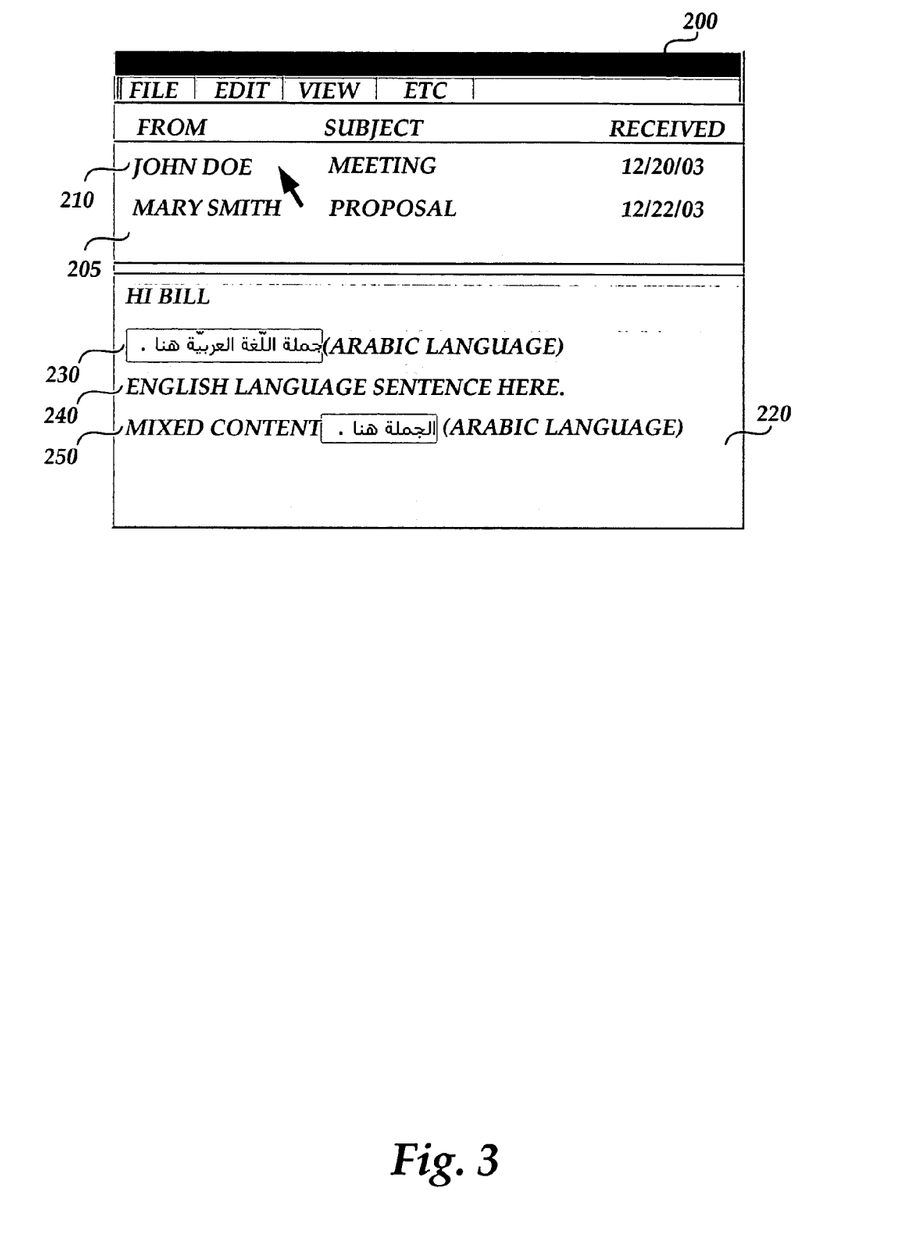

As briefly described above, many spoken languages are rendered, displayed and read in a left-to-right text reading order. Other spoken languages are rendered, displayed and read in a right-to-left text reading order. For example, the English language is read in a left-to-right text reading order and the Arabic and Hebrew and a number of Asian languages are read in a right-to-left text reading order. Additionally, left-to-right languages are typically displayed in a in a left alignment. On the other hand, right-to-left text reading order languages are typically displayed in a right alignment. FIGS. 2 and 3 illustrate screen displays of an exemplary electronic mail application user interface showing rendered text according to embodiments of the present invention. As should be understood by those skilled in the art, the drawing illustrated in FIG. 2 is by way of illustration only and is not limiting of the invention that is claimed herein. Embodiments of the present invention are equally applicable to the rendering of the text in a multi-lingual environment for any software application capable of displaying text in a multi-lingual environment, for example, word processing applications, slide presentation applications, spreadsheet applications and the like.

Referring still to FIG. 2, the example electronic mail user interface 200 includes a mail pane 205 in which is displayed a user's received electronic mail. For example, referring to the example screen display in FIG. 2, the user has received mail from two sending parties. Below the received mail pane 205 is a preview pane 220 for providing the user at least a portion of an electronic mail message received by one of the e-mail senders shown in the mail pane 205. For example, when the user focuses her mouse or other selection device on the first mail received, the preview pane 220 is populated with a portion or all of the text associated with that electronic mail item.

Referring to the preview pane 220, and for purposes of illustration, assume that the electronic mail text presented to the user includes an Arabic sentence 230, an English sentence 240 and a mixed-content sentence 250. The illustration of the Arabic language sentence 230 is illustrated using English language words written in a right-to-left text reading order. As should be appreciated by those skilled in the art, an actual Arabic language sentence 230 may be written according to the alphabet, spelling, and character structure of an Arabic language. A mixed-content sentence includes one or more words from a left-to-right text reading order language and one or more words from a right-to-left text reading order language. Without the benefits of embodiments of the present invention, the Arabic language sentence 230 is rendered in a right-to-left text reading order and is aligned to the right side of the preview pane 220. The English language sentence 240 is rendered in a left-to-right text reading order and is aligned to the left side of the preview pane 220.

The mixed-content sentence 250 is rendered such that a portion of the sentence that is from a left-to-right text reading order language, such as English, is rendered in left-to-right text reading order and is aligned to the left side of the preview pane while a second portion of the mixed-content sentence 250 is displayed in a right-to-left text reading order and is aligned to the right side of the preview pane 220. As should be understood by those skilled in the art, the occurrence of the mixed-content 250 is common where, for example, a sentence written in a first language such as English refers to text written in a second language such as Arabic. For example, a mixed-context sentence 250 might read, "I recommend that you read the new Arabic studies book entitled "(Arabic language title here)." As is appreciated by those skilled in the art, the English language portion of the sentence would typically be rendered in a left-to-right text reading order while the Arabic portion of the sentence, namely the title of the proposed book, would be rendered in a right-to-left text reading order. Thus, when the example sentence is rendered in a computer-generated display such as the preview pane 220, the mixed text order and mixed alignment condition problem may be presented as illustrated in FIG. 2.

Referring now to FIG. 3, the example electronic mail text presented to the user in the preview pane 220 is illustrated with a desirable text reading order and text alignment applied to each sentence of the text selection according to embodiments of the present invention. That is, each sentence 230, 240, 250 has been aligned to one side of the preview pane 220, and each of the sentences 230, 240, 250 is rendered according to the text reading order associated with the given language. For example, the Arabic language sentence 230 is rendered in a right-to-left text reading order even though the sentence has been aligned to the left to make for a better presentation. The English language sentence is presented in left-to-right text reading order and has been aligned to the left. The mixed-content sentence 250 has been rendered such that each portion of the sentence is rendered in a text reading order according to a language of the given portion and the sentence as a whole has been aligned to the left. As should be understood by those skilled in the art, each of the sentences 230, 240 and 250 could also be aligned to the right, if desired, and as described in detailed below. Accordingly, the text selection illustrated in FIG. 3 has been rendered in a text reading order and in a text alignment that makes the rendered text reading order more visually pleasing than the rendering of the same text selection illustrated in FIG. 2.

Figure 4:
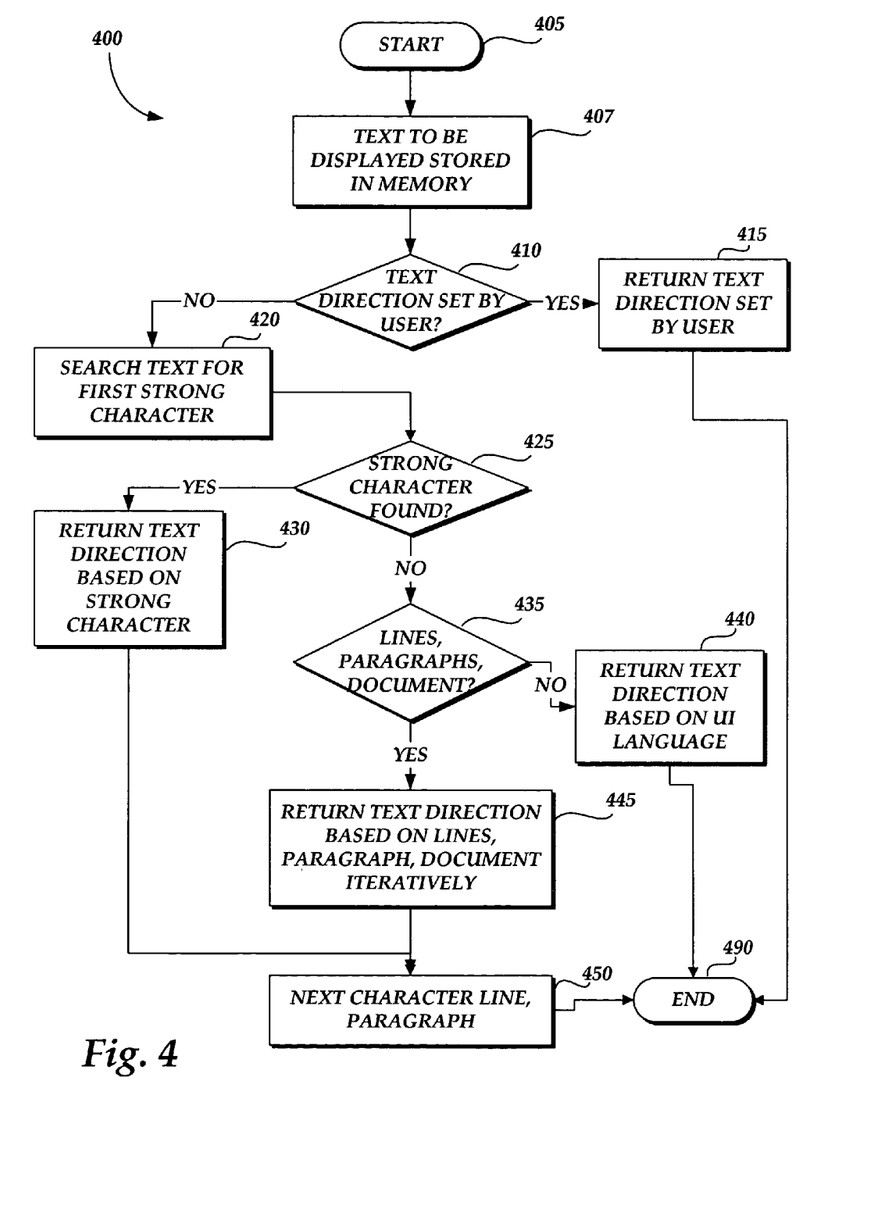
FIG. 4 is a flow diagram showing an illustrative routine for determining an appropriate text reading order for displayed text according to embodiments of the present invention.

In order to achieve the text rendering results illustrated in the preview pane 220 of FIG. 3, a determination must first be made as to the proper text reading order of a given word, sentence, paragraph or document followed by a determination as to the most desirable text alignment (right or left) to be applied to the text when the text is displayed. FIG. 4 is a flow diagram showing an illustrative routine for determining an appropriate text reading order for displayed text according to embodiments of the present invention. The method or routine 400 begins at start block 405 and proceeds to block 407 where text in a multi-lingual environment is entered by a user that must be subsequently displayed, as illustrated in FIGS. 2 and 3 above. Consider for example that the text entered at block 407 is the electronic mail message illustrated in FIGS. 2 and 3. At block 407, the text entered by the user is stored to a memory location where it may be subsequently scanned in accordance with the embodiments of the present invention for determining the best text reading order and text alignment of the text or portions of the text contained therein.

At decision block 410, a determination is made as to whether the user has specified a particular text reading order for the text to be displayed as illustrated in FIGS. 2 and 3. That is, the user of the electronic mail application 200 may specify that text displayed in the mail pane 205 or preview pane 220, for example, is to be displayed in a left-to-right text reading order. If the user has specified a particular text reading order, all displayed text will be displayed in a left-to-right text reading order as directed by the user. As described above, and as should be understood by those skilled in the art, discussion of the present invention in terms of the electronic mail display 200 shown in FIGS. 2 and 3 is for purposes of illustration only. Embodiments of the present invention are equally applicable to other software applications that display texts such as word processing applications, spreadsheet applications, slide presentation applications and the like. If the user has specified a particular text reading order for displaying text, the routine moves to block 415 and the text reading order specified by the user is returned for use in determining how text is to be rendered. That is, the software application responsible for displaying the text will receive the returned value at block 415 and will display all text according to the text reading order set by the user.

Referring back to block 410, if the user has not specified a particular text display direction, the routine moves to block 420 and the stored text is scanned on a character-by-character basis in search for a first strong character associated with a given language. That is, each character entered by the user to be displayed is scanned to determine whether that character is a strong character associated with a given language. In this context, a strong character includes a character that is known from a given language. For example, if the first character encountered in the sentence 230, illustrated in FIG. 2, is known to be a character from the Arabic language, a determination is made that a strong character has been found according to the Arabic language. On the other hand, if the first character found in the sentence 240 is determined to be a known character from the English language, a determination is made that a strong character from the English language has been found. On the other hand, if a character is not recognized as belonging to a particular language context, such as the case for certain symbols such as dollar signs, numbers, punctuation marks and the like, a determination is made that a strong character has not be found.

At block 425, if a strong character has been found, the routine moves to block 430, and the text reading order associated with the language to which the strong character belongs is returned. For example, if the first character of the Arabic sentence 230, illustrated in FIGS. 2 and 3, is determined to be a strong character from the Arabic language, a text reading order of right-to-left is returned for the first character in that sentence. Accordingly, the software application responsible for displaying the text illustrated in FIGS. 2 and 3 will display that character in a right-to-left text reading order along with subsequent characters until a determination is made that another text reading order should be utilized. The routine next moves to block 450 and the next character is scanned to determine whether that character is a strong character. As should be understood, the method then proceeds back to block 420 to determine whether the next scanned character is a strong character as described above.

At block 425, if a strong character is not found, the routine moves to block 435 where a text reading order analysis is performed on a line-by-line basis, a paragraph-by-paragraph basis or for an entire document. For example, if the first character of the Arabic language sentence 230 scanned according to embodiments of the present invention is not a strong character that identifies the character as belonging to the Arabic language, the entire line 230 may be analyzed to determine whether any text reading order properties have been set for the line. For example, if the user entering the text associated with the sentence 230 set a right-to-left property on the sentence after the user enters the sentence, that property may be utilized at decision block 435 to determine that the sentence or the line 230 should be displayed according to a right-to-left text reading order. If no text reading order property is set for a given line of text 230, a determination may be made as to whether a text reading order property is set for a whole paragraph. If no text reading order property is set for a given paragraph, a determination may be made at block 435 as to whether a text reading order property is set for an entire document.

If a text reading order property is set for a given line, paragraph or document at block 435, the routine moves to block 445 and the text reading order associated with the text reading order property is returned for use in displaying the text. That is, if a text reading order property of right-to-left is set for the Arabic language sentence 230, the returned text reading order property will cause the software application responsible for displaying the sentence 230 to display the sentence 230 in a right-to-left text reading order, as illustrated in FIGS. 2 and 3. As should be understood, the process described herein is performed iteratively beginning with an analysis on a character-by-character basis and flowing through to an analysis of lines, paragraphs and documents as required. That is, after a determination is made as to whether a scanned character is a strong character, the process returns to the analysis of the next character in sequence. Only when characters may not be determined as strong characters does the process turn to an analysis on a line-by-line basis. Furthermore, only after an analysis on a line-by-line basis does not result in a determination as to an appropriate text reading order does the process analyze on a paragraph-by-paragraph basis, and so on. Accordingly, at block 450, the next character stored in memory at block 407 is scanned to determine whether it is a strong character associated with a given language and associated with a particular text reading order.

Referring back to block 435, if the text reading order may not be determined from an analysis of the characters, lines, paragraphs or documents, as described above, the routine moves to block 430 and an analysis of the language associated with the user interface with which the text is displayed is performed. For example, referring to FIGS. 2 and 3, a determination is made as to what language is used for displaying tools, buttons, headings and the like of the user interface 200. Next, a text reading order associated with the user interface language is returned as the text reading order for use in displaying the text. That is, if it cannot be determined from an analysis of the text itself as to an appropriate text reading order for use in displaying the text, a text reading order associated with the user interface language itself is used to make the final determination for text such as the sentences 230, 240, 250 illustrated in FIGS. 2 and 3.

Figure 5:
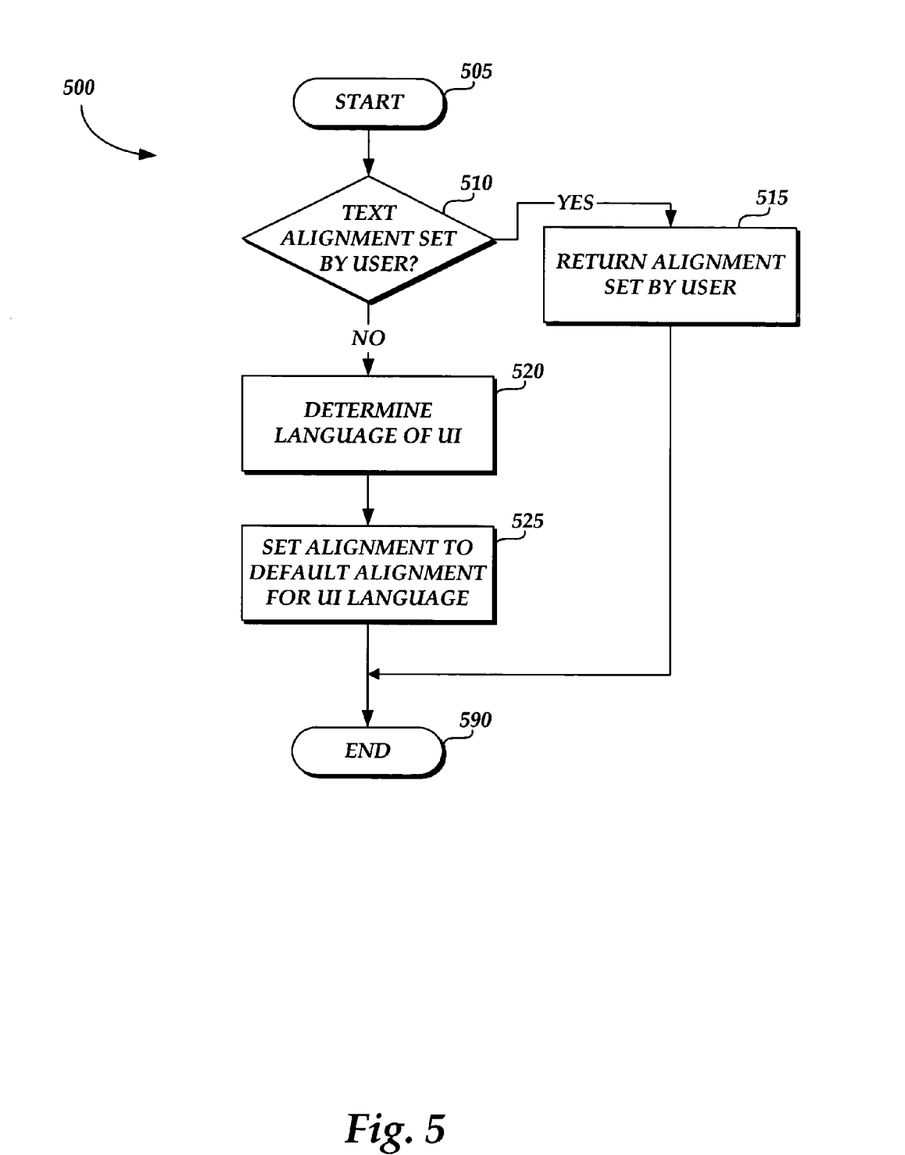
FIG. 5 is a flow diagram showing an illustrative routine for determining an appropriate text alignment for displayed text according to embodiments of the present invention.

After the appropriate text reading order is determined for a given text selection as described above, a determination is next made as to an appropriate text alignment for the text selection. FIG. 5 is a flow diagram showing an illustrative routine for determining an appropriate text alignment for displayed text according to embodiments of the present invention. The routine 500 begins at block 505 and proceeds to block 510 where a declaration is made as to whether a particular text alignment has been set by the user. If the user has set a particular alignment, for example left alignment, the routine moves to block 515 and the alignment set by the user is returned for setting the alignment of a given text selection.

If the text alignment has not been set by the user, the routine moves to block 520 and the user interface language is determined. At block 525, a text alignment associated with the user interface language is returned as the text alignment to be used for the given text selection. That is, in the absence of a particular text alignment set by the user, a text alignment associated by the user interface language utilized by the user is set for a given text selection. Advantageously, if the user is satisfied with a particular language, for example English, for use as the user interface language, it is determined that the text alignment associated with that language is acceptable to the user for rendering text selections such as the text illustrated in FIG. 3. On the other hand, if the user desires that text selection should be rendered according to a different alignment, such as a right side alignment, the user is free to specify that text alignment which will be adopted for aligning a given text selection, as described above with reference to decision block

510. Once the text alignment for a given text selection is determined, as described herein, the routine ends at block 590.

Referring back to FIGS. 2 and 3, once the text reading order for given characters, words, sentences or paragraphs is determined, and once the text alignment is determined, the text selection may be displayed as illustrated in FIG. 3. As shown in FIG. 3, the Arabic language sentence 230 is rendered in a right-to-left text reading order, the English language sentence 240 is rendered in a left-to-right text selection, and the mixed-content sentence 250 is rendered according both a left-to-right and a right-to-left text reading order. However, the entire text selection made up of the three sentences 230, 240, 250 is aligned to the left side of the preview pane 220 according to embodiments of the present invention described herein.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of rendering text and data in a multi-lingual environment, the method comprising:
   receiving a text selection containing text portions entered according to a plurality of spoken languages;
   determining that no text reading order for rendering the text selection on a computer-enabled display has been set;
   in response to a determination that no text reading order for rendering the text selection has been set, scanning the text selection to determine the text reading order for rendering the text selection on the computer-enabled display, wherein scanning the text selection to determine the text reading order for rendering the text selection on the computer-enabled display comprises:
     determining whether a first portion of the text selection is entered according to a first spoken language, wherein determining whether the first portion of the text selection is entered according to the first spoken language comprises:
       determining whether each character of the first portion of the text selection comprises a character from the first spoken language,
       determining whether any text character of the first portion of the text selection identifies the first portion of the text selection as belonging to the first spoken language,
       in response to determining that no text character of the first portion of the text selection identifies the first portion of the text selection as belonging to the first spoken language, determining whether a line property is associated with a line of text containing the first portion of text, wherein the line property identifies the line of text as belonging to the first spoken language; and
       in response to determining that the line property is associated with the line of text that identifies the line of text as belonging to the first spoken language, returning a text reading order associated with the line property for rendering the line of text,
     determining the text reading order associated with the first spoken language based on the determination that the first portion of the text selection is entered according to the first spoken language, and
     determining a text display alignment associated with the first spoken language based on the determination that the first portion of the text selection is entered according to the first spoken language;
   rendering the first portion of the text selection in the determined text reading order; and
   rendering the determined text display alignment according to the first spoken language.

2. The method of claim 1, after receiving the text selection containing text portions entered according to the plurality of spoken languages, storing the text selection at a memory location.

3. The method of claim 1, further comprising returning the text reading order for rendering the text selection on a computer-enabled display.

4. The method of claim 1, prior to rendering the first portion of the text selection in the determined text reading order, returning the text reading order associated with the first spoken language as the text reading order for rendering the text according to the first spoken language.

5. The method of claim 1, further comprising determining that the text reading order is a left to right text reading order.

6. The method of claim 1, further comprising determining that the text reading order is a right to left text reading order.

7. The method of claim 1, further comprising when no property identifies the line of text as belonging to the first spoken language, determining whether a paragraph property is associated with a paragraph of text containing the line of text, where the paragraph property identifies the paragraph as belonging to the first spoken language; and
   when a paragraph property identifies the paragraph as belonging to the first spoken language, returning a text reading order associated with the paragraph property for rendering the paragraph of text.

8. The method of claim 7, further comprising when no property of the text selection allows the text selection to be identified with a particular text reading order, determining a text reading order associated with the user interface language utilized by the user interface for displaying the text selection; and
   returning the text reading order associated with the user interface language for rendering the text selection according to the text reading order associated with the user interface language.

9. The method of claim 1, further comprising:
   scanning the text selection to determine whether a second portion of the text selection is entered according to a second spoken language; and
   when a second portion of the text selection is entered in a second spoken language, determining a text reading order for the second portion of text according to the second spoken language.

10. The method of claim 9, further comprising:
    rendering the second portion of the text selection in the determined text reading order for the second portion of the text such that the rendered text selection contains the first portion of the text selection rendered according to the determined reading order for the first portion and the second portion of the text selection rendered according to the determined reading order for the second portion.

11. The method of claim 10, wherein rendering the text selection includes rendering the text selection containing both the first portion and the second portion according to the returned text display alignment.

12. The method of claim 11, wherein the text alignment is left alignment.

13. The method of claim 11, wherein the text alignment is right alignment.

14. A method of rendering text and data in a multi-lingual environment, the method comprising:
- receiving a text selection containing text portions entered according to a plurality of spoken languages;
- determining that no a text reading order for rendering the text selection on a computer-enabled display has been set;
- in response to a determination that no text reading order for rendering the text selection has been set, scanning the text selection to determine the text reading order for rendering the text selection on the computer-enabled display, wherein scanning the text selection to determine the text reading order for rendering the text selection on the computer-enabled display comprises:
  - determining whether a first portion of the text selection is entered according to a first spoken language, wherein determining whether the first portion of the text selection is entered according to the first spoken language comprises:
    - determining whether each character of the first portion of the text selection comprises a character from the first spoken language,
    - determining whether any text character of the first portion of the text selection identifies the first portion of the text selection as belonging to the first spoken language,
    - in response to determining that no text character of the first portion of the text selection identifies the first portion of the text selection as belonging to the first spoken language, determining whether a line property is associated with a line of text containing the first portion of text, where the line property identifies the line of text as belonging to the first spoken language, and
    - in response to determining that the line property is associated with the line of text that identifies the line of text as belonging to the first spoken language, returning a text reading order associated with the line property for rendering the line of text,
  - determining the text reading order associated with the first spoken language based on the determination that the first portion of the text selection is entered according to the first spoken language,
  - determining a text display alignment associated with the first spoken language based on the determination that the first portion of the text selection is entered according to the first spoken language,
  - determining whether a text display alignment has been established for the text selection, and
  - in response to determining that no text display alignment has been established for the text selection, determining a text display alignment associated with the first spoken language,
- rendering the first portion of the text selection in the determined text reading order; and
- rendering the determined text display alignment according to the first spoken language.

15. The method of claim 14, further comprising returning the established text display alignment for aligning the text selection.

16. The method of claim 15, further comprising;
- aligning the text selection according to the established text alignment direction.

17. A method of rendering text and data in a multi-lingual environment, the method comprising:
- receiving a text selection containing text portions entered according to a plurality of spoken languages;
- determining that no text reading order for rendering the text selection on a computer-enabled display has been set;
- in response to a determination that no text reading order for rendering the text selection has been set, scanning the text selection to determine the text reading order for rendering the text selection on the computer-enabled display, wherein scanning the text selection to determine the text reading order for rendering the text selection on the computer-enabled display comprises:
  - determining whether a first portion of the text selection is entered according to a first spoken language, wherein determining whether the first portion of the text selection is entered according to the first spoken language comprises:
    - determining whether each character of the first portion of the text selection comprises a character from the first spoken language,
    - determining whether any text character of the first portion of the text selection identifies the first portion of the text selection as belonging to the first spoken language,
    - in response to determining that no text character of the first portion of the text selection identifies the first portion of the text selection as belonging to the first spoken language, determining whether a line property is associated with a line of text containing the first portion of text, where the line property identifies the line of text as belonging to the first spoken language, and
    - in response to determining that the line property is associated with the line of text that identifies the line of text as belonging to the first spoken language, returning a text reading order associated with the line property for rendering the line of text, and
  - determining the text reading order associated with the first spoken language based on the determination that the first portion of the text selection is entered according to the first spoken language;
- determining whether a text display alignment has been established for the text selection;
- in response to determining that a text display alignment has been established for the text selection, returning the established text display alignment for aligning the text selection;
- in response to determining that no text display alignment has been established for the text selection, determining a text display alignment associated with a user interface language utilized by a user interface for displaying the text selection;
- returning the text display alignment associated with the user interface language for aligning the text selection;
- rendering the first portion of the text selection in the determined text reading order; and
- aligning the text selection according to the returned text display alignment.

18. The method of claim 17, further comprising scanning the text selection to determine whether a second portion of the text selection is entered according to a second spoken language; and if a second portion of the text selection is entered in a second spoken language, determining a text reading order for the second portion of text according to the second spoken language.

19. The method of claim 18, further comprising:
- rendering the second portion of the text selection in the determined text reading order for the second portion of the text such that the rendered text selection contains the first portion of the text selection rendered according to the determined reading order for the first portion and the second portion of the text selection rendered according to the determined reading order for the second portion; and wherein the text selection containing both the first portion and the second portion is rendered according to the returned text display alignment.

* * * * *